April 6, 1965  E. N. CASE ETAL  3,177,091
HANDLING WAX-COATED ARTICLES
Filed Jan. 9, 1961 2 Sheets-Sheet 2
FIG. 4.
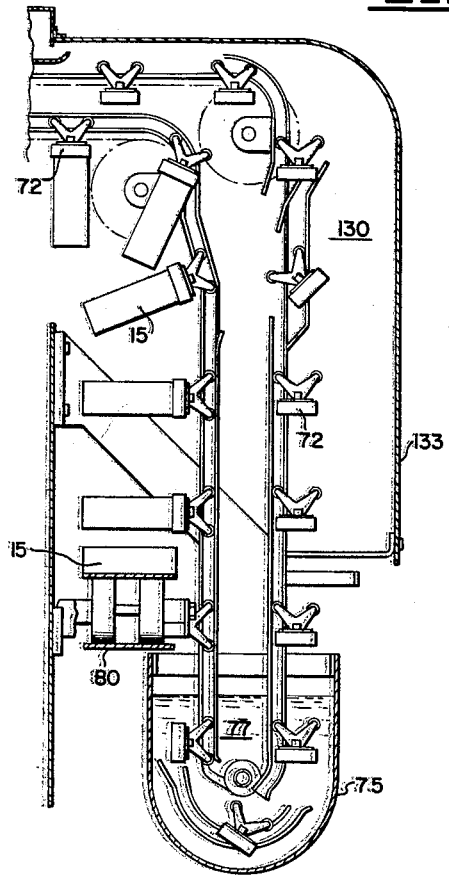
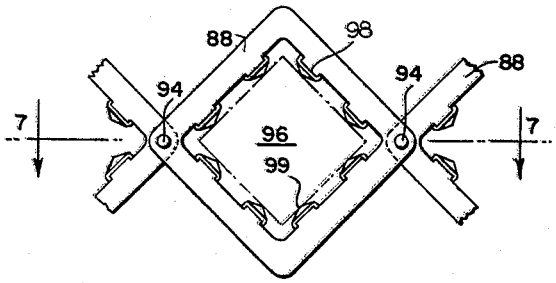
FIG. 6.
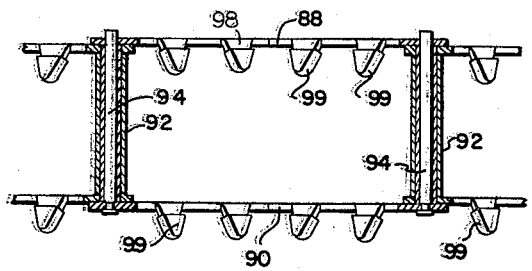
FIG. 7.
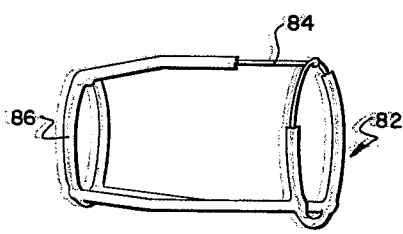
FIG. 5.
INVENTOR
EVERETT N. CASE
JOHN PODLIPNIK
BY *Adams, Forward & McLean*
ATTORNEY

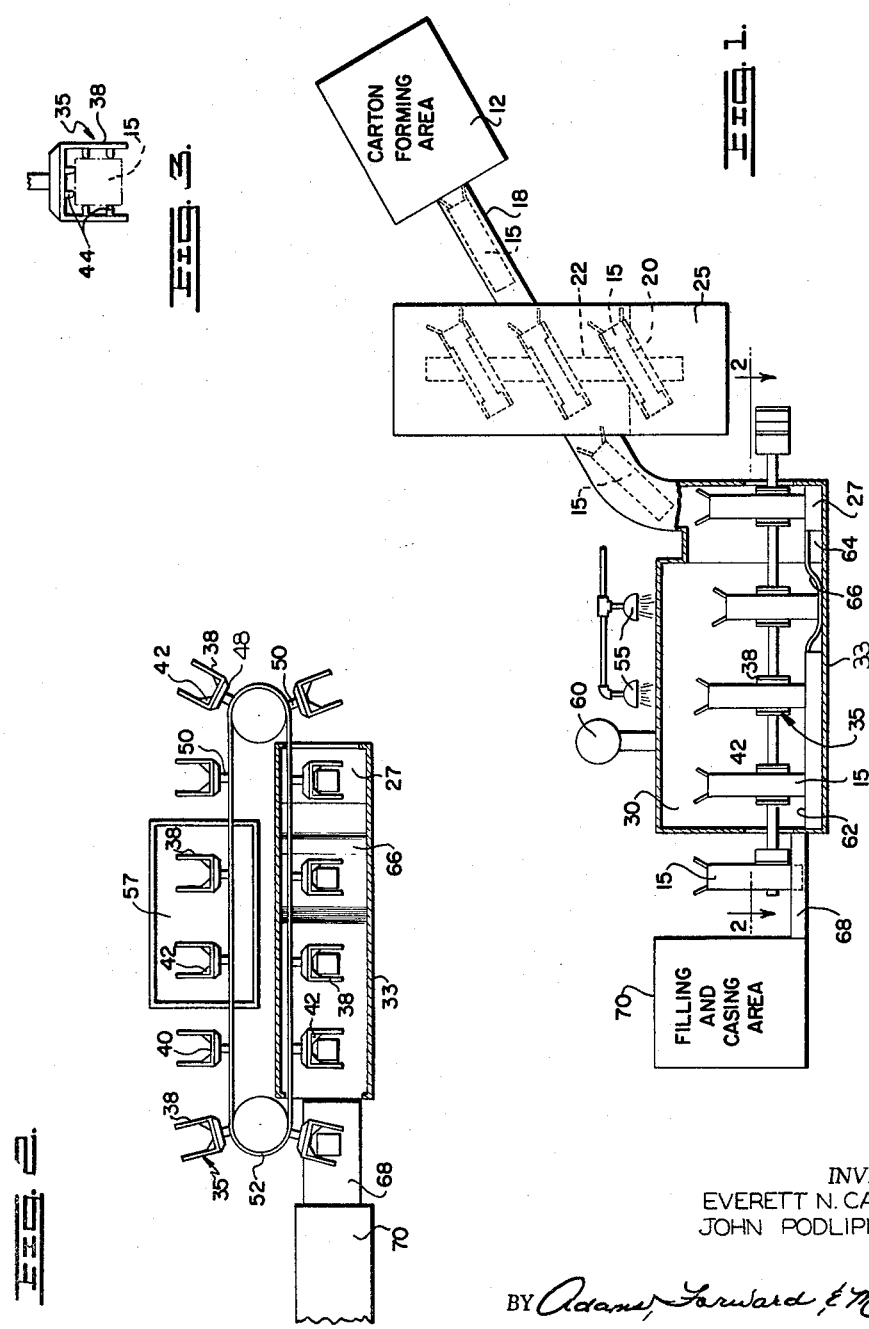

United States Patent Office 3,177,091
Patented Apr. 6, 1965

3,177,091
HANDLING WAX-COATED ARTICLES
Everett N. Case, Homewood, and John Podlipnik, Palos Heights, Ill., assignors, by mesne assignments, to Sinclair Research, Inc., New York, N.Y., a corporation of Delaware
Filed Jan. 9, 1961, Ser. No. 81,503
15 Claims. (Cl. 117—113)

This invention is a method and apparatus for handling wax-coated objects and material after liquid wax has been applied and before the wax has solidified. During the manufacture, by a continuous process, of wax-covered fibrous, e.g., paperboard, containers such as milk cartons, a machine performs these functions: a flat, pre-cut carton is opened, squared and glued at the bottom with a thermosetting adhesive. The carton is then placed in a carrier and the carton plus the carrier are passed through a liquid, predominantly paraffin, wax bath. The carton remains in the carrier during draining, after which it is transported, usually by a second carrier, to a cooler where the wax hardens. Then, an automatic filler meters a correct quantity of milk into the carton after which the top is folded and stapled. The finished carton is then delivered to another conveyor for casing.

During the cooling phase, the surface of wax-coated material and objects is in a semi-solid, uncongealed, sticky state, and numerous handling difficulties have been encountered in the conveying of such objects from the wax-coating stage to the use stage. During the tacky phase of the wax-solidification, wax has a tendency to gather on any of the equipment which comes in contact with the wax-coated object. Although improved formulations of wax can prevent actual removal of a significant amount of wax from the object, the small amount of wax which is removed from each object gradually builds up on the equipment, requiring frequent shut-downs for its removal. Also, wax build-up frequently requires coating machinery to be more complex, as for example, where identical synchronized means are employed for conveying an object through coating, drying and filling zones, the conveying operations may be performed by three sets of conveyors in the attempt to confine wax build-up to the conveyor in the drying zone. Such a system, of course, frequently requires additional means for engaging and disengaging the wax-coated objects at each zone juncture. In this invention wax build-up may be so effectively prevented that one set of conveyors may move the object through all three phases, eliminating the need for such engaging and disengaging means.

This invention presents a method for handling wax-coated objects while the wax is in its sticky, congealing phase which comprises preventing contact of the wax-coated object with any dry surfaces. The surface of any equipment which touches the wax-coated object has a substantially continuous film of water in contact with the object, effectively preventing adherence of wax.

This invention also provides a moving and conveying means for wax-coated objects, particularly wax-coated containers, wherein the conveying means have rigid surfaces made of water-wettable absorbent material. In a preferred embodiment, the conveying means provides for contact with the wax-coated object at the intersection of flat planes of the object. For example, the apparatus of this invention preferably conveys the conventional "square" milk carton by contacting the carton at its corners. The conveying means may take the form of guides, claws, pushers, rollers or plates fixed to an endless belt conveyor. The apparatus of this invention also includes means for supplying the conveying means with water. The movements of the conveying means may be confined to the cooling zone of the coating apparatus, or the conveying means may move through one or more zones of other activity.

The water-wettable surfaces referred to above may be provided by any one or more of a number of known materials. Such materials are generally inorganic and non-fibrous, such as plaster of Paris, unglazed ceramics or porous concrete. Generally, known apparatus for the manufacture of wax-coated containers from flat, pre-cut cartons by opening, squaring and gluing with a thermosetting adhesive, placing the carton in or on a conveyor and immersing the carton in a liquid wax bath, removing the carton from the bath, draining the carton and subsequently cooling, may be adapted to practice this invention. The conveying means which contact the sticky waxed object may be made by conventional molding or other processes performed upon plaster of Paris or other water wettable inorganic plastic material such as Portland cement. Unglazed, fired ceramics are also good rigid water-wettable absorbent materials. The starting plastic materials should be fine-grained enough to give the finished article a small-pore structure having good capillary action and a smooth contacting surface to avoid leaving an impression in the wax coating. The conveying means can also be a coated product, such as a metallic member coated with the rigid hydrophylic material, such as unglazed porcelain, at points of contact. The chances for leaving an impression in the wax coating are further minimized by providing for pushing the wax-coated object at folds or corners of the object. For example, it has been found that the corners of "square" milk cartons have less wax on their surface, due to greater wax saturation of the paper.

In this invention, the conveying means is associated with a means for wetting the conveying means or at least that part of the conveying means which contacts the wax-coated article. The wetting means may be a water bath or fountain, one or more shower heads, etc. Ordinary tap water may be supplied by the wetting means and the water should preferably be free of any material, such as wetting agents, which could lead to rupture of the water film on the contacting member during contact of the conveying means with the wax-coated article. The water may be applied to the contacting member at any convenient temperature, but preferably at a temperature where vaporization of the water film will be substantially avoided.

The invention will be better understood by reference to the accompanying drawings which are to be considered illustrative only and not limiting. In the drawings:

FIGURE 1 presents a diagrammatic or flow-sheet illustration of a device in which the conveying means of this invention may be employed;

FIGURE 2 is a cross-section of the cooling section along the line 2—2 of the FIGURE 1;

FIGURE 3 is a plan view of an alternate conveyor which may be used in the embodiment shown in FIGURES 1 and 2;

FIGURE 4 is a vertical cross-sectional view of the discharge end of another wax-coating device employing this invention;

FIGURE 5 shows in perspective another type of conveying means for a container in a wax-coating apparatus with the water-absorbent coating partly broken away;

FIGURE 6 shows in plan view still another form of conveying means and;

FIGURE 7 is a vertical cross-section along the line 7—7 of FIGURE 6.

Referring to the drawings, FIGURE 1 illustrates diagrammatically an apparatus for the production of paperboard milk containers such as the well known "Pure-Pak" containers. A flat, pre-cut carton is opened, squared and glued with a thermosetting adhesive in forming area 12. The formed carton 15 is conveyed by a conveyor such as chute 18 to a work holding means such as a basket 20. The basket is attached to a conveyor mechanism 22 for introducing the articles into and withdrawing them from an enclosed wax bath 25 usually maintained at a temperature of about 160 to 190° F., preferably about 175 to 180° F. The wax is usually molten paraffin wax with or without additives which impart special properties to the wax. After withdrawing the carton 15 and basket 20 from the wax bath 25, the carton is ejected or dropped onto a hot plate 27.

A cooling area 30 is provided for the wet cartons within the casing 33. The cartons are conveyed into the cooling area by pushers 35. These pushers, as illustrated, are U-shaped, having the vertical legs 38 and the horizontal leg 40. As shown, the inside corners 42 of the U are filled with, or at least provided with surfaces, at about a 45° angle to each intersecting leg, made of a rigid water-wettable material such as plaster of Paris. These corners serve to provide the pushing force to move the cartons and also provide the means to hold the carton away from the walls of the casing 33. Alternatively, as shown in FIGURE 3, both the vertical and the horizontal legs may be provided with a plurality of buttons 44 which actually contact the carton 15, but hold such contact to a minimum surface area. It may be feasible, sometimes, to provide the pushers of the modification of FIGURE 2 with auxiliary buttons 44 in addition to the filled corners 42. The buttons 44, as well as the corners 42, are made of a rigid water-wettable and water-absorbent material such as plaster of Paris, unglazed ceramic material, etc., as mentioned above, and during passage through the cooling zone 30 the surfaces of these corners or buttons bear a substantially continuous film of water. The pushers 35 are held by brackets 48 and supports 50 to the endless belt or chain 52.

After conveying each carton through the cooling area, each pusher travels back to its carton pick-up station past means which apply water to the buttons. In the embodiment shown in FIGURE 1, the pushers pass underneath the sprayers 55 which keep the buttons wet. The device may be provided with the trough 57 under the sprayers to catch excess water.

The cooling area 30 may be supplied with cool air and/or exhausted of warm air by the blower 60, which generally maintains a temperature of about 40 to 60° F., e.g. about 50° F., in the cooling area. The casing 33 may be provided with a false bottom 62 to hold a water bath 64. The false bottom may be provided with a perforated dip section 66 for quickly quenching the wax on the bottom section of the carton, so that the sticky phase of wax drying and hardening of the bottom of the carton will be past by the time the main part of the false bottom is reached. Another moving means such as a conveyor mechanism 68 moves the cooled carton to a filling and casing area 70 where milk or other liquids are injected into the hollow carton. The filled carton is then cased and readied for delivery or storage.

FIGURE 4 shows a section of a device which in its general structure is known to the art. In this device the cartons 15 are conveyed by the grippers 72 in the final section of the cooling area 130 defined by the casing or hood 133. As adapted to perform the process of this invention, the grippers 72 are made of a water-wettable absorbent material. Also, in place of merely a casing for protection of the operator, the apparatus is supplied with the pan 75 which holds the water bath 77. Thus, the grippers, after surrendering the carton to the conveyor belt 80, pass to the water bath 77 where they absorb further water before returning to the carton pick-up station.

FIGURE 5 shows a conveying means which comprises the frame 82 for reception of the waxed article. Although the general configuration of frames of this type is known, in this invention the frame comprises the wire armature 84 having a rigid water-absorbent coating 86 of, for example, unglazed porcelain.

FIGURES 6 and 7 show an open-box type conveyor, which generally is made of stamped metal plates. Each carrier comprises an upper plate 88 and a lower plate 90. The upper and lower plates aer separated and aligned by the sleeves 92 on the bolts 94 which serve to hold adjacent "boxes" together. As can be seen, each box provides a central open space 96 for reception of the wax-coated container. The open space is formed by the alignment of the openings in the upper and lower plates. Upper plates 88 and lower plates 90 may be provided with corners or buttons such as are illustrated in FIGURES 1, 2 and 3 to minimize contact with the uncongealed wax-coated objects, or they may be provided with the integral metal tabs 98 which may be bent, as illustrated, out of the plane of the plates. These tabs have a rigid coating 99 of absorbent water-wettable material.

Most conventional apparatus used in making wax-coated objects may be easily adapted to the practice of this invention. For example, a conventional wax-coating machine may have conveyors such as illustrated in FIGURE 3, but provided with aluminum buttons. The aluminum buttons may be readily coated with an absorbent, water-wettable material, or they may be removed and replaced with absorbent water-wettable buttons. Alternatively, the aluminum buttons may be removed and the corners may be filled with the water-wetable material.

It will be seen by one of ordinary skill in the art that as many embodiments of the apparatus of this invention exist as there are types of conveyors for sticky wax-coated articles. All of these embodiments will provide the conveying means with rigid water-wet contacting members for the wax-coated articles. The apparatus will include contact members which are water-absorptive and water-wettable and means for supplying the water to the members. For example, in a coating machine which conveys the wax-coated article on metallic rollers, this invention may be practiced by providing ceramic or ceramic-coated rollers and by providing a fountain filled with water under the rollers, through which the rollers pass during their rotation.

The method of this invention, that is, the conveying of sticky wax-coated articles by a water-wet conveyor may be practiced even in manual processes by catching and carrying the article in a water-wet unglazed ceramic dish or by the use of wet ceramic-coated pincers.

The method and apparatus are not restricted to use with paraffin or other wax of mineral origin, but may be used with waxes of animal and vegetable origin as well.

It is claimed:

1. A method which comprises coating an article with molten wax, and conveying said article through a cooling zone by a rigid surface, water-wettable, water-absorptive, inorganic, now fibrous member having a substantially continuous film of water in contact with the uncongealed wax-coating of said article.

2. The method of claim 1 in which the article has flat intersecting planes and the contact is at the intersection of planes.

3. A method for handling an article having an uncongealed wax-coating which comprises providing a rigid conveying means having a rigid, water-wettable, water-absorptive, inorganic, non-fibrous surface, wetting the said surface with water and conveying said article through a cooling zone by contact of the said article with the said wetted surface.

4. The method of claim 3 in which the surface is wetted by dipping in water.

5. In a method for coating with wax a paperboard container having flat sides, wherein the container is conveyed through a zone where a composition of predominantly paraffin wax is applied, and through a zone where the wax is cooled and congealed the improvement which comprises conveying the container during congealing by a rigid surfaced, water-wettable, water-absorptive, inorganic, non-fibrous member having a substantially continuous film of water in contact with the container.

6. A method which comprises coating an article with molten wax and conveying said article through a cooling zone by a rigid member, the surface of which is plaster of Paris, having a substantially continuous film of water in contact with the said article.

7. A method which comprises coating an article with molten wax, and conveying said article through a cooling zone by a rigid-surfaced, water-wettable, water-absorptive member, the surface of which is a non-fibrous, inorganic material selected from the group consisting of plaster of Paris, unglazed ceramics and porous concrete, having a substantially continuous film of water in contact with the uncongealed wax-coating of said article.

8. A method for handling an article having an uncongealed wax coating which comprises providing a rigid conveying means having a rigid, water-wettable, water-absorptive surface which is a non-fibrous, inorganic material selected from the group consisting of plaster of Paris, unglazed ceramics and porous concrete, wetting the said surface with water and conveying said article through a cooling zone by contact of the said article with the said wetted surface.

9. In a method for coating with wax a paperboard container having flat sides, wherein the container is conveyed through a zone where a composition of predominantly paraffin wax is applied, and through a zone where the wax is cooled and congealed, the improvement which comprises conveying the container during congealing by a rigid-surfaced, water-wettable, water-absorptive member the surface of which is a non-fibrous, inorganic material selected from the group consisting of plaster of Paris, unglazed ceramics and porous concrete, having a substantially continuous film of water in contact with the container.

10. In a coating apparatus having means for applying molten wax to an article and having means for conveying the waxed article through a cooling zone, a conveyor having a rigid surfaced, water-wettable, water-absorptive inorganic, non-fibrous member contacting the waxed article, and means for wetting said member with water.

11. The apparatus of claim 10 in which the conveying means is U-shaped and the member is at an inside corner of the U.

12. The apparatus of claim 10 in which the water-absorptive member is the coating of a metal conveyor.

13. In a coating apparatus having means for applying molten wax to an article and having means for conveying the waxed article through a cooling zone, a conveyor having a rigid, water-wettable, water-absorptive member, the surface of which is plaster of Paris, for contacting the waxed article, and means for weting said member with water.

14. The apparatus of claim 10 in which the coated article has flat sides and the article is contacted at the intersection of its flat planes.

15. In a coating apparatus having means for applying molten wax to an article and having means for conveying the waxed article through a cooling zone, a conveyor having a rigid-surfaced, water-wettable, water-absorptive member, the surface of which is a non-fibrous, inorganic material selected from the group consisting of plaster of Paris, unglazed ceramics and porous concrete, for contacting the waxed article, and means for wetting said member with water.

References Cited by the Examiner
UNITED STATES PATENTS

| | | | |
|---|---|---|---|
| 1,210,279 | 12/16 | Diener | 117—38 |
| 1,830,741 | 11/31 | Low | 118—70 |
| 2,251,785 | 8/41 | Dons et al. | 117—5.3 X |
| 2,336,401 | 12/43 | James | 198—131 X |
| 2,382,619 | 8/45 | Earp | 118—500 X |
| 2,425,719 | 8/47 | Berger | 18—47 X |
| 2,444,282 | 6/48 | Creevy | 18—47 X |
| 2,819,986 | 1/58 | Edwards et al. | 117—158 X |
| 2,877,140 | 3/59 | Olstad | 117—119.4 |
| 2,952,567 | 9/60 | Nordquist et al. | 198—131 X |
| 3,026,572 | 3/62 | Reick | 18—47 X |
| 3,052,590 | 9/62 | Maros et al. | 156—289 |

RICHARD D. NEVIUS, *Primary Examiner.*